United States Patent
Corbin et al.

(10) Patent No.: US 9,485,339 B2
(45) Date of Patent: Nov. 1, 2016

(54) SYSTEMS, METHODS, AND MOBILE DEVICES FOR PROVIDING A USER INTERFACE TO FACILITATE ACCESS TO PREPAID WIRELESS ACCOUNT INFORMATION

(75) Inventors: Sean Corbin, San Jose, CA (US);
Simon King, Chicago, IL (US);
Jeremiah O'Leary, Chicago, IL (US);
Ross Lockwood, Chicago, IL (US)

(73) Assignee: AT&T Mobility II LLC, Atlanta, GA (US)

( * ) Notice: Subject to any disclaimer, the term of this patent is extended or adjusted under 35 U.S.C. 154(b) by 633 days.

(21) Appl. No.: 12/783,064

(22) Filed: May 19, 2010

(65) Prior Publication Data

US 2011/0066985 A1 Mar. 17, 2011

Related U.S. Application Data

(60) Provisional application No. 61/179,707, filed on May 19, 2009.

(51) Int. Cl.
*G06F 3/048* (2013.01)
*H04M 1/725* (2006.01)
*G06F 3/0488* (2013.01)
(Continued)

(52) U.S. Cl.
CPC ...... *H04M 1/72519* (2013.01); *G06F 3/04883* (2013.01); *H04M 15/84* (2013.01); *H04M 15/844* (2013.01); *H04M 15/85* (2013.01); *H04M 15/851* (2013.01); *H04M 15/852* (2013.01); *H04M 15/854* (2013.01); *H04M 17/00* (2013.01); *H04M 17/02* (2013.01); *H04M 17/20* (2013.01); *H04M 2215/815* (2013.01); *H04M 2215/8129* (2013.01); *H04M 2215/8137* (2013.01); *H04M 2215/8158* (2013.01); *H04M 2215/8166* (2013.01); *H04M 2250/22* (2013.01)

(58) Field of Classification Search
CPC ......... H04M 1/72519; H04M 15/854; H04M 15/846; H04M 17/00; H04M 17/10; G06F 3/04883
USPC .................................................. 715/863, 864
See application file for complete search history.

(56) References Cited

U.S. PATENT DOCUMENTS 6,105,063 A * 8/2000 Hayes, Jr. ...................... 709/223
6,462,941 B1 * 10/2002 Hulick et al. ............ 361/679.24
(Continued)

OTHER PUBLICATIONS

"Handbook for the Palm III Organizer," 1998, 3Com.*

*Primary Examiner* — Doon Chow
*Assistant Examiner* — Andrew T Chiusano
(74) *Attorney, Agent, or Firm* — Hartman & Citrin LLC (57) ABSTRACT

A method for operating a mobile device includes, in response to receiving a swipe gesture via a user interface of the mobile device, displaying a balance of a prepaid wireless service account on a display of the mobile device. The balance may be displayed in a currency such as monetary currency or a proprietary currency such as minutes or credits provided by a wireless service provider. The method may also include displaying an expiration time to identity a time remaining until the balance expires. The method may also include generating a balance request including a request for the balance of the prepaid wireless service account from a prepaid billing system in response to receiving the swipe gesture, transmitting the balance request to the prepaid billing system, and receiving the balance in response to the balance request.

15 Claims, 7 Drawing Sheets

(51) Int. Cl.
*H04M 15/00* (2006.01)
*H04M 17/00* (2006.01)
*H04M 17/02* (2006.01)

(56) References Cited

U.S. PATENT DOCUMENTS

| | | | |
|---|---|---|---|
| 6,487,401 B2* | 11/2002 | Suryanarayana et al. | 455/406 |
| 7,676,767 B2* | 3/2010 | Hofmeister et al. | 715/863 |
| 2005/0169503 A1* | 8/2005 | Howell et al. | 382/115 |
| 2006/0010400 A1* | 1/2006 | Dehlin et al. | 715/856 |
| 2006/0026521 A1* | 2/2006 | Hotelling et al. | 715/702 |
| 2006/0276180 A1* | 12/2006 | Henry | 455/412.2 |
| 2007/0152984 A1* | 7/2007 | Ording et al. | 345/173 |
| 2007/0254629 A1* | 11/2007 | Black et al. | 455/406 |
| 2008/0039050 A1* | 2/2008 | Black et al. | 455/406 |
| 2008/0122796 A1* | 5/2008 | Jobs et al. | 345/173 |
| 2009/0198359 A1* | 8/2009 | Chaudhri | 700/94 |
| 2009/0278806 A1* | 11/2009 | Duarte et al. | 345/173 |

* cited by examiner

SYSTEMS, METHODS, AND MOBILE DEVICES FOR PROVIDING A USER INTERFACE TO FACILITATE ACCESS TO PREPAID WIRELESS ACCOUNT INFORMATION

CROSS REFERENCE TO RELATED APPLICATION

This application claims priority to and benefit of U.S. Provisional Application No. 61/179,707, filed May 19, 2009, the entirety of which is herein incorporated by reference.

TECHNICAL FIELD

The present disclosure relates generally to wireless communications service and, more particularly, to systems, methods, and mobile devices for providing a user interface to facilitate access to prepaid wireless account information.

BACKGROUND

Wireless telecommunications services are provided to customers via one of two payment methods—prepaid and postpaid. Postpaid accounts are designed such that if the customer exceeds the number of voice minutes, data capacity, text messages, or other services allocated to their account in a billing cycle, the postpaid customer will be charged for the excess services at the end of the billing cycle. Often times, the customer is unaware of the overage and is requested to pay an unexpected amount at the end of the billing cycle.

Services, such as AT&T's Rollover® service, aim to eliminate overages by accumulating unused minutes at the end of each billing cycle for use in future billing cycles. For example, if a customer uses 900 minutes of a 1000 minute service plan during a billing cycle, the remaining 100 unused minutes are added to the customer's total available Rollover® minutes. If the customer exceeds their 1000 minute service plan during a future billing cycle, the customer's Rollover® account is debited the overage amount of minutes instead of the customer being charged overage fees for the excess minutes. Minutes in a customer's Rollover®account are typically set to expire after a predetermined time, such as every year.

Prepaid customers typically purchase a credit for a predetermined number of voice minutes prior to receiving wireless voice service. By purchasing credit in advance of use on a wireless service network, a customer can access a wireless service network without contractual obligation and an ongoing bill (e.g., re-occurring bill). A customer may then use the wireless network until the expiration of the purchased, or prepaid, credit.

SUMMARY

According to one aspect of the present disclosure, a method for operating a mobile device includes, in response to receiving a swipe gesture via a user interface of the mobile device, displaying a balance of a prepaid wireless service account on a display of the mobile device.

In one embodiment, the balance is a currency amount such as a monetary currency (e.g., U.S. dollars). In another embodiment, the currency amount is in a proprietary currency such as a number of minutes.

In one embodiment, the user interface is a capacitive touch sensor. In another embodiment, the user interface is a touchscreen interface.

In one embodiment, the method further includes, in response to receiving a second swipe gesture via the user interface, displaying an expiration time to identify a time remaining until the balance expires.

In one embodiment, the method further includes displaying an expiration time to identify a time remaining until the balance expires upon receiving the swipe gesture during a threshold time period. The threshold time period may be a custom time period set at the mobile device. Alternatively, the threshold time period may be a custom time period set in response to a request received from a server.

In one embodiment, the method further includes, in response to receiving a second swipe gesture via the user interface in a direction opposite the swipe gesture, removing the displayed currency amount from the display.

In one embodiment, the method further includes, in response to a call being initiated at the mobile device, removing the displayed currency amount from the display.

In one embodiment, the method further includes, prior to displaying the balance, generating a balance request to request the balance for the prepaid wireless service account from a prepaid billing system in response to receiving the swipe gesture, transmitting the balance request to the prepaid billing system, and receiving the balance in response to the balance request. The balance request may be an unstructured supplementary service data (USSD) code to request the balance for the prepaid wireless service account. The balance request may be transmitted to the prepaid billing system by way of a USSD gateway. The balance may be received from the USSD gateway in a USSD response. Alternatively, the balance may be received as a text message. The balance may be accompanied by an expiration date of the balance. The USSD code may be *777# or another USSD code.

According to another aspect of the present disclosure, a tangible computer-readable medium includes computer-executable instructions that, when executed by a processor of a mobile device, cause the processor to perform steps of the aforementioned method.

According to yet another aspect of the present disclosure, a mobile device includes a display, a user interface in communication with the display, a processor in communication with the user interface, and a memory in communication with the processor. The memory is configured to store instructions that, when executed by the processor, cause the processor to perform steps of the aforementioned method.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1A:
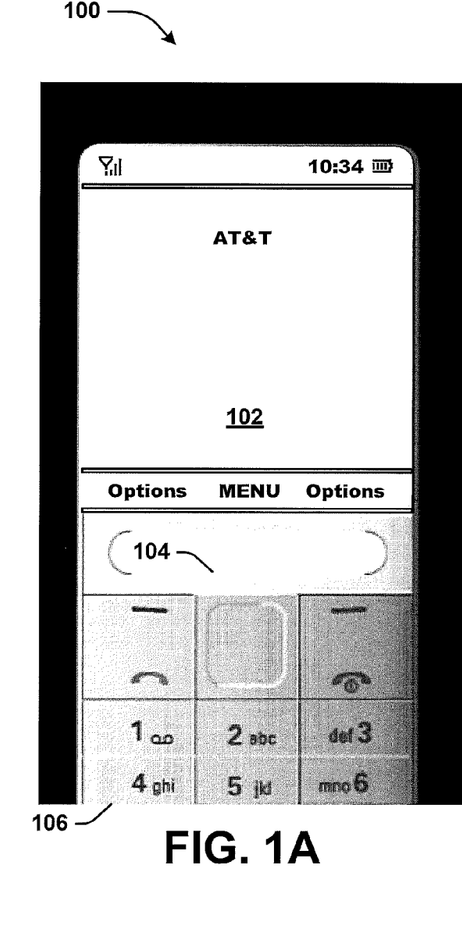
FIGS. 1A-1C illustrate an exemplary mobile device and a user performing a gesture thereon, according to an embodiment of the present disclosure.
Figure 1B:
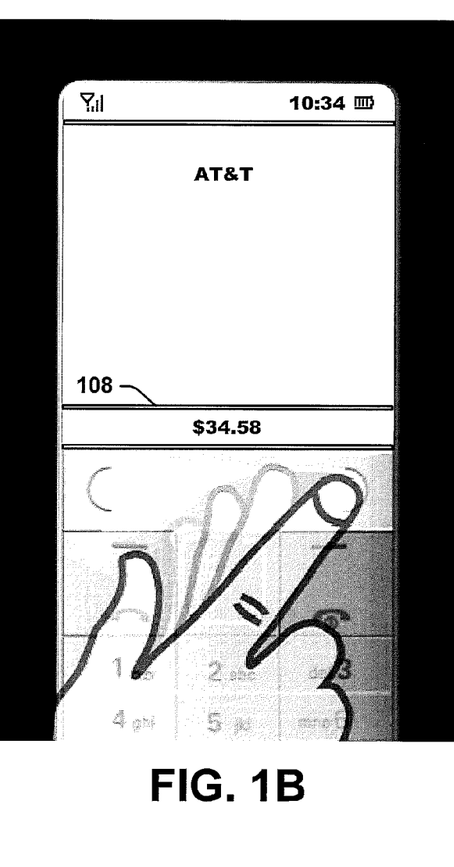
Figure 1C:
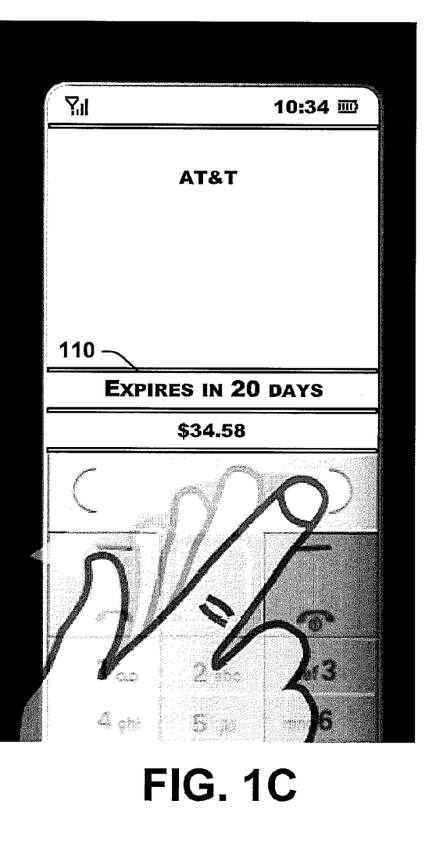

Turning first to FIGS. 1A-1C, a mobile device 100 is illustrated according to one embodiment of the present disclosure. The illustrated mobile device 100 is a "candy-bar"-style phone. Alternatively, the mobile device 100 may be a slide-style phone or a flip-style phone. The mobile device 100 and the components (e.g., display, keypad, and other interface components) thereof may be configured in other styles. As illustrated, the mobile device 100 includes a display 102, a capacitive touch sensor 104, and a keypad 106.

The display 102 may be any display types, including, but not limited to, a liquid crystal display (LCD), a plasma display, an organic light emitting diode (OLED) display, an LED display, an LED-backlit LCD, a touchscreen display, a multi-touch touchscreen display, a rear projection display, a 3-D display, a laser display, a holographic display, any combinations thereof, and the like. The display 102 may be used to display information relative to the operation of the mobile device 100 including, for example, displaying calling information, device status (e.g., battery level, date, time), network operator, message waiting indicator, navigation menus, application launch, and the like.

The capacitive touch sensor 104 is designed under principles of capacitive sensing technology. The illustrated capacitive touch sensor 104 is designed to overlay a portion of the mobile device 100 as a standalone button as illustrated. Alternatively, the capacitive touch sensor 104 may be integrated into a portion or the entirety of the display 102, thereby providing a touchscreen interface for a portion or the entire display 102. The capacitive touch sensor 104 may be implemented so as to give a perception of a touchscreen interface even though the touch portion is a standalone touch-sensitive button that is separate from the display 102. Moreover, the capacitive touch sensor 104 may be sized and shaped as illustrated or sized and shaped in a variety of other ways.

In one embodiment, the capacitive touch sensor 104 senses a finger or object (e.g., a stylus or other object) moving from left-to-right or right-to-left in a swiping motion, referred to herein as a "swipe gesture." The capacitive touch sensor 104 detects the swipe gesture and initiates a prepaid application stored in a memory (illustrated in FIG. 2 and described herein below) of the mobile device 100. In some embodiments, the prepaid application is configured to retrieve data for a prepaid wireless service account associated with the mobile device. In some embodiments, the data includes a remaining balance and/or an expiration date.

As illustrated in FIG. 1B, a first swipe gesture triggers the prepaid application to display a remaining balance 108. The remaining balance may be displayed in any currency, including government issued currency and proprietary currency offered by a particular company (e.g., credits or minutes provided by a wireless service provider). As illustrated in FIG. 1C, a second swipe gesture triggers the prepaid application to display an expiration date 110. Alternatively, the first swipe gesture and second swipe may cause display of the expiration date and the remaining balance, respectively. In some embodiments, the first swipe gesture triggers both the remaining balance and the expiration date to be displayed. In some embodiments, a swipe gesture in a direction opposite the first or second swipe gesture removes some or all previously displayed information. Moreover, in some embodiments, the displayed information is removed in response to an outgoing call being initiated or an incoming call arriving or being answered, for example, or during other device operations.

Figure 2:
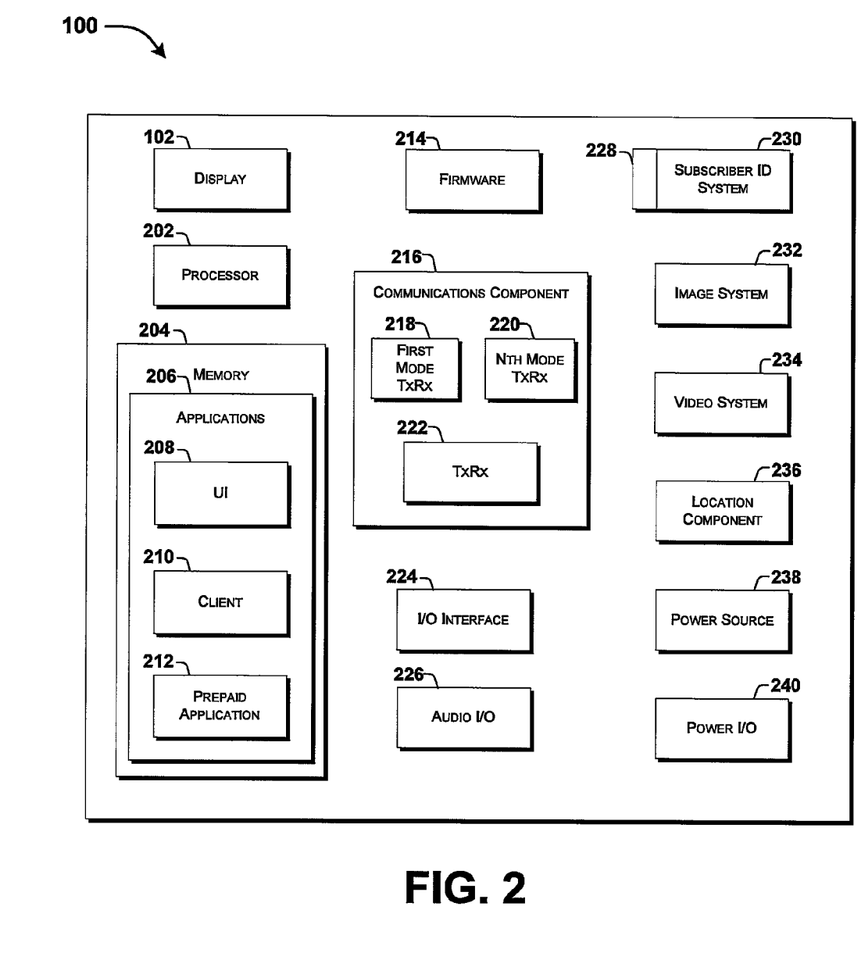
FIG. 2 illustrates an exemplary mobile device and various components thereof, according to an embodiment of the present disclosure.

Turning now to FIG. 2, a schematic block diagram of an exemplary device 100 for use in accordance with embodiments of the present disclosure is illustrated. Although not all connections are shown between the components illustrated in FIG. 2, the components can interact with each other to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, mobile devices, combinations thereof, and the like.

The mobile device 100 may be a multimode headset, and may include a variety of computer-readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, random access memory (RAM), read-only memory (ROM), electronically erasable programmable ROM (EEPROM), flash memory or other memory technology, compact disk ROM (CD-ROM), digital versatile/video disk (DVD), or other optical disk storage, magnetic tape, magnetic disk storage or other magnetic storage devices, or any other medium that can be used to store the desired information and that can be accessed by the device 100.

The illustrated device 100 includes a display 102 for displaying multimedia such as, for example, text, images, video, telephony functions such as Caller ID data, setup functions, menus, music, metadata, messages, wallpaper, graphics, Internet content, device status, preferences settings, map and location data, billing information, wireless service account information (e.g., prepaid or postpaid account data), and the like. The illustrated device 100 also includes a processor 202 for controlling, and/or processing data. A memory 204 interfaces with the processor 202 for the storage of data and/or applications 206.

The applications 206 include, for example, unstructured supplementary service data (USSD) software, short message service (SMS) messaging software, enhanced messaging service (EMS) messaging software, multimedia message service (MMS) messaging software, a wireless application protocol (WAP) browser, and the like. The applications 206 may also include a user interface (UI) application 208. The UI application 208 interfaces with a client 210 (e.g., an operating system) to facilitate user interaction with device functionality and data, for example, entering message content, viewing received messages, answering/initiating calls, entering/deleting data, password entry and setting, configuring settings, address book manipulation, and the like. The UI application 208 includes an interface with the capacitive touch sensor 104 to provide a user interface for initiating a prepaid application 212. The prepaid application 212 is used by the mobile device 100 to access prepaid account data, such as a remaining balance and/or an expiration date via a USSD message or internally as stored in the memory 204, for example.

The applications 206 may include other applications (not shown) such as, for example, add-ons, plug-ins, email applications, music applications, video applications, camera applications, location-based service (LBS) applications, power conservation applications, game applications, productivity applications, entertainment applications, combinations thereof, and the like, as well as subsystems and/or components. The applications 206 may be stored in the memory 204 and/or in a firmware 214, and may be executed by the processor 202. The firmware 214 may also store code for execution during initialization of the device 100.

A communications component 216 may interface with the processor 202 to facilitate wired/wireless communications with external systems including, for example, cellular networks, location systems, voice-over-Internet-protocol (VoIP) networks, local area networks (LAN's), wide area networks (WAN's), metropolitan area networks (MAN's), personal area networks (PAN's), and other networks, which can be implemented using WIFI, WIMAX, combinations and/or improvements thereof, and the like. The communications component 216 may also include a multimode communications subsystem for providing cellular communications via different cellular technologies. For example, a first cellular transceiver 218 can operate in one mode, for example, Global System for Mobile communications (GSM), and an Nth transceiver 220 may operate in a different mode, for example, Universal Mobile Telecommunications System (UMTS). While only two transceivers 218, 220 are illustrated, it should be appreciated that a plurality of transceivers can be included. The communications component 216 may also include a transceiver 222 for other communications technologies such as, for example, Wi-Fi®, Wi-Max®, BLUETOOTH®, infrared, infrared data association (IRDA), near-field communications (NFC), other radio frequency (RF), and the like. The communications component 216 may also facilitate reception from terrestrial radio networks, digital satellite radio networks, Internet-based radio services networks, combinations thereof, and the like.

An input/output (I/O) interface 224 is provided for input/output of data and/or signals. The I/O interface 224 may be a hardwire connection, such as, for example, an universal serial bus (USB), mini-USB, audio jack, PS2, IEEE 1394, serial, parallel, Ethernet (RJ48), RJ11, and the like, and can accept other I/O devices such as, for example, the capacitive touch sensor 104, keyboards, keypads (e.g., the keypad 106), mice, interface tethers, stylus pens, printers, thumb drives, touchscreens, multi-touchscreens, touch pads, trackballs, joysticks, microphones, remote control devices, monitors, displays, combinations thereof, and the like. It should be appreciated that the I/O interface 224 can be used for communications between the device and a network or local device, instead of, or in addition to, the communications component 216.

Audio capabilities may be provided by an audio I/O component 226 that can include a speaker for the output of audio signals and a microphone to collect audio signals. The device 100 may include a slot interface 228 for accommodating a subscriber identity system 230 such as, for example, a subscriber identity module (SIM) or universal SIM (USIM). The subscriber identity system 230 may alternatively be manufactured into the device 100, thereby obviating the need for a slot interface 228. In some embodiments, the subscriber identity system 230 stores certain features, user characteristics, rules, policies, models, contact information, and the like. The subscriber identity system 230 may be programmed by a manufacturer, a retailer, a user, a computer, a network operator, and the like.

The device 100 may include an image capture and processing system 232 (image system). Photos may be obtained via an image capture subsystem of the image system 232, for example, a camera. The device 100 may also include a video system 234 for capturing, processing, recording, modifying, and/or transmitting video content.

A location component 236 is also illustrated. The location component 236 is configured to send and/or receive signals such as, for example, Global Positioning System (GPS) data, assisted-GPS (A-GPS) data, WIFI/WIMAX and/or cellular network triangulation data, combinations thereof, and the like. The location component 236 may interface with cellular network nodes, telephone lines, satellites, location transmitters and/or beacons, wireless network transmitters and receivers, for example, WIFI hotspots, radio transmitters, combinations thereof, and the like. The device 100 may obtain, generate, and/or receive data to identify its location, or may transmit data used by other devices to determine the device 100 location.

The device 100 may also include a power source 238 such as batteries and/or other power subsystem (AC or DC). The power source 238 may interface with an external power system or charging equipment via a power I/O component 240.

Figure 3:
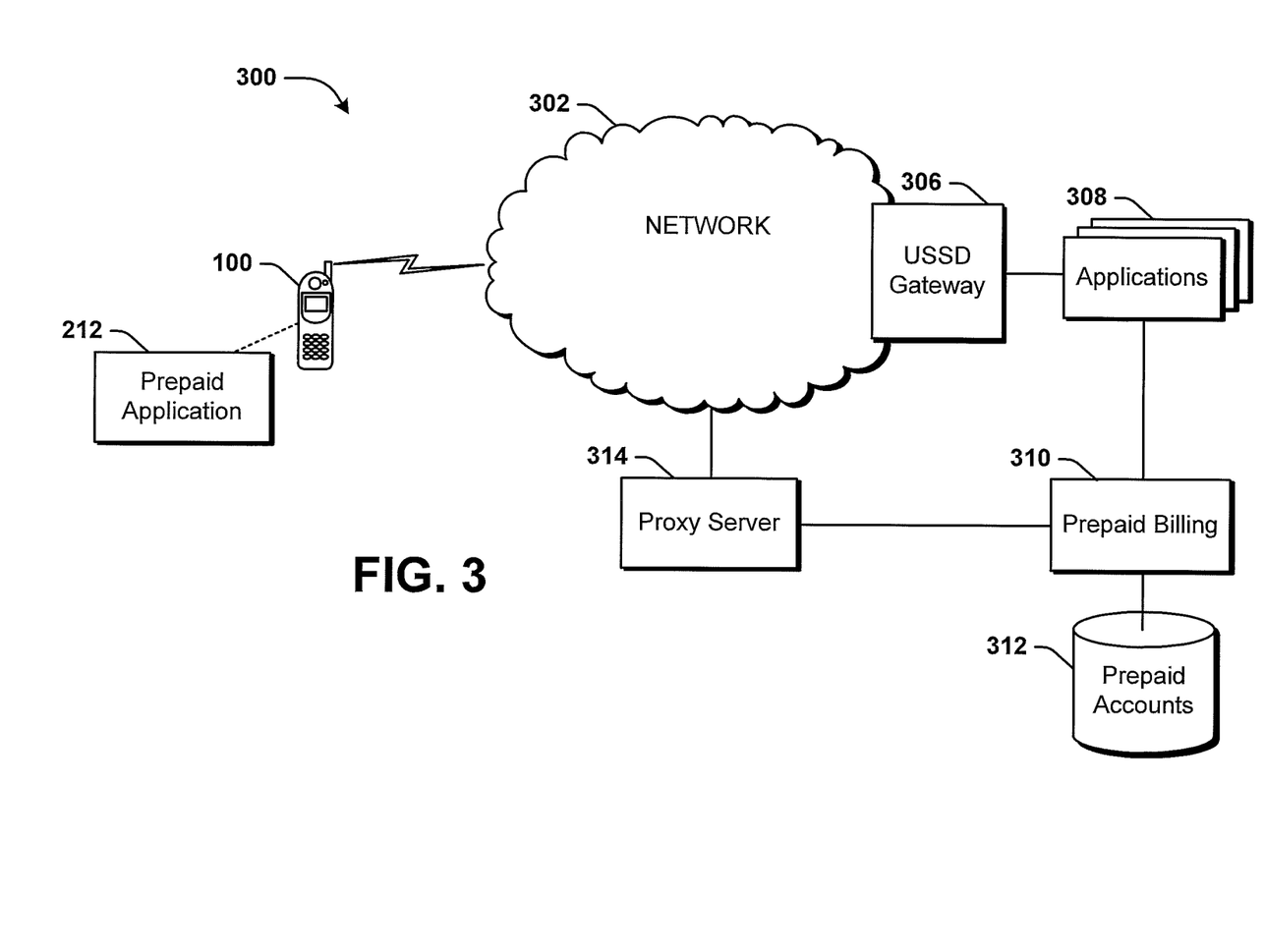
FIG. 3 illustrates an exemplary wireless communications network in which various aspects of the present disclosure can be implemented.

Turning now to FIG. 3, an exemplary wireless communications system 300 is illustrated. As illustrated, the wireless communications system 300 includes the mobile device 100 as described in detail with reference to FIGS. 1 and 2. The mobile device 100 includes a prepaid application 212 as described with reference to FIG. 2. The prepaid application 212 may be executed by the processor 202 of the mobile device 100 to perform some or all of the steps of the methods illustrated in FIGS. 4-7, described herein below. The mobile device 100 is in communication with a wireless network 302.

The wireless network 302 may operate using any existing or yet to be developed telecommunications technology. Some examples of suitable telecommunications technologies include, but are not limited to, networks utilizing Global System for Mobile communications (GSM), Universal Mobile Telecommunications System (UMTS), Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), WIMAX and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as, High-Speed Downlink Packet Access (HSDPA), Enhanced Uplink (EUL) or otherwise termed High-Speed Uplink Packet Access (HSDPA), Evolved HSPA (HSPA+), and various other current and future data bearers.

In some embodiments, the wireless network 302 includes network elements to facilitate the exchange of USSD messages to/from the mobile device 100 and a USSD gateway 306, such as described below with reference to FIGS. 4-6. The USSD gateway 306, in turn, may communicate with one or more USSD applications 308 to retrieve prepaid account data from a prepaid billing system 310 and/or a prepaid accounts database 312 via the various methods described herein. In other embodiments, the prepaid application 212 communicates with a proxy server 314 via the mobile device 100 through the network 302 in accordance with the method described below with reference to FIG. 7 to retrieve prepaid account data. The illustrated proxy server 314 is in communication with the billing system 310 and the prepaid accounts database 312.

Figure 4:
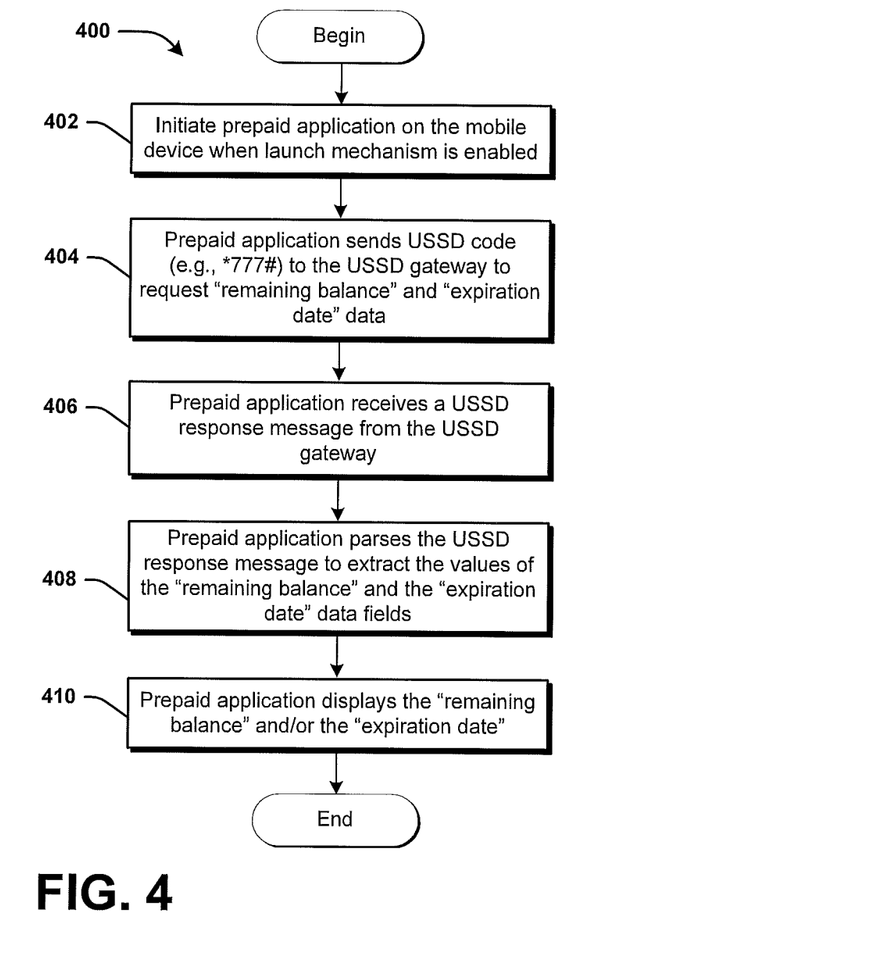
FIG. 4 illustrates an exemplary method, according to an embodiment of the present disclosure.

Turning now to FIG. 4, a method 400 is illustrated, according to one exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed at least partially by execution of computer-readable instructions included on a computer-readable medium, such as the memory 204.

The method 400 begins and flow is to block 402, wherein the prepaid application 212 is initiated on the mobile device 100 in response to a launch mechanism being enabled. In the illustrated embodiment of FIG. 1, the launch mechanism is a swipe gesture received by the mobile device 100 through the capacitive touch sensor 104. Alternatively, another button, gesture, motion, or other input is used as the launch mechanism for the prepaid application 212. At block 404, the prepaid application 212 sends a USSD code to the USSD gateway 306 to request prepaid account data including, for example, "remaining balance" and/or "expiration date" data. In one embodiment, the prepaid application 212 emulates dialing *777# to request a "balance remaining" and/or "expiration date" for a prepaid account associated with the mobile device 100. Other USSD codes are contemplated.

At block 406, the prepaid application 212 receives a USSD response message from the USSD gateway 306. The USSD response message may be a typical USSD response message for a *777# code, including data fields for the "balance remaining" and "expiration date" for the requested prepaid account. Alternatively, the USSD response message includes data fields for the "balance remaining" or the "expiration data." At block 408, the prepaid application 212 parses the USSD response message to extract the values in these data fields. At block 410, the prepaid application 212 displays the "remaining balance" and/or the "expiration date" according to the data received and/or how the prepaid application 212 is configured to display the received data. In one embodiment, the prepaid application 212 is configured to display the "remaining balance" and/or the "expiration date" in response to a first and a second swipe gesture, respectively, or vice versa. In another embodiment, both data types are displayed following a single swipe gesture. In any case, the displayed data may be removed following a subsequent swipe or other gesture. As described above, other gestures or inputs are contemplated. The method 400 can end.

Figure 5:
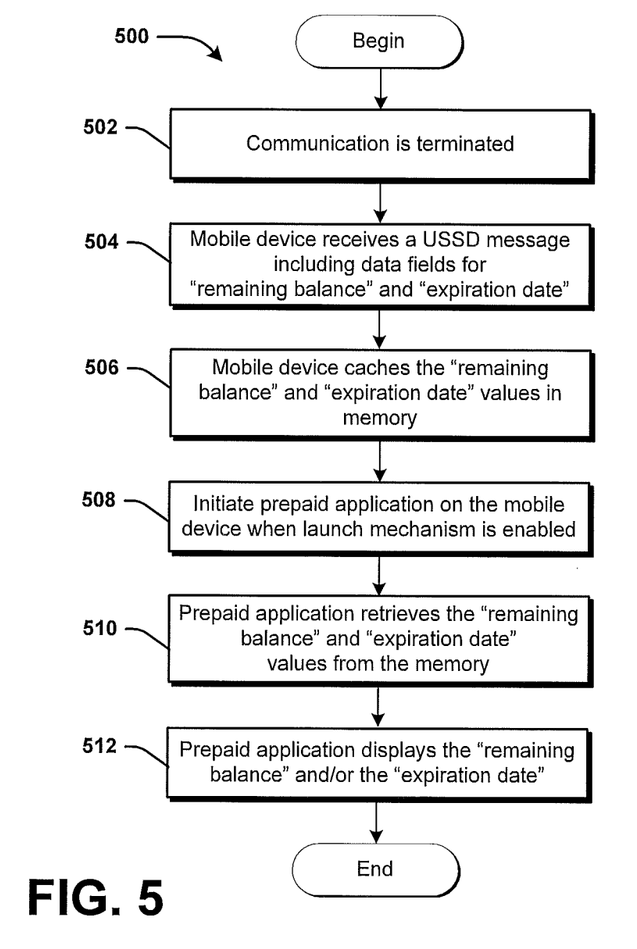
FIG. 5 illustrates an exemplary method, according to another embodiment of the present disclosure.

Turning now to FIG. 5, an exemplary method 500 is illustrated, according to another embodiment of the present disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed at least partially by execution of computer-readable instructions included on a computer-readable medium, such as the memory 204.

The method 500 begins and flow is to block 502, wherein a communication is terminated. For example, a call is terminated during which a portion of a remaining balance for a prepaid account is exhausted, thereby prompting the prepaid billing system 310 or some combination of the prepaid billing system 310 and a USSD application (e.g., the illustrated USSD application 308) to generate a USSD message including data fields for "remaining balance" and/or "expiration date" updated to reflect the new remaining balance and/or new expiration date (e.g., call began before midnight and terminated after midnight thereby decreasing the number of days to expire by one day). The prepaid billing system 310 sends the USSD message to the mobile device 100.

At block 504, the mobile device 100 receives the USSD message. At block 506, the mobile device 100 caches the values for the "remaining balance" and/or "expiration date" data fields in the memory 204. At block 508, the prepaid application 212 is initiated on the mobile device 100 in response to a launch mechanism being enabled. In the illustrated embodiment of FIG. 1, the launch mechanism is a swipe gesture received by the mobile device 100 through the capacitive touch sensor 104. Alternatively, another button, gesture, motion, or other input can be used as the launch mechanism for the prepaid application 212. At block 510, the prepaid application 212 retrieves the values from the memory 204.

At block 512, the prepaid application 212 displays the "remaining balance" and/or the "expiration date" according to the values retrieved and/or how the prepaid application 212 is configured to display the received data. In one embodiment, the prepaid application 212 is configured to display the "remaining balance" and/or the "expiration date" in response to a first and a second swipe gesture, respectively, or vice versa. In another embodiment, both data types are displayed following a single swipe gesture. In any case, the displayed data may be removed following a subsequent swipe or other gesture. As described above, other gestures or inputs are contemplated. The method 500 can end.

Figure 6:
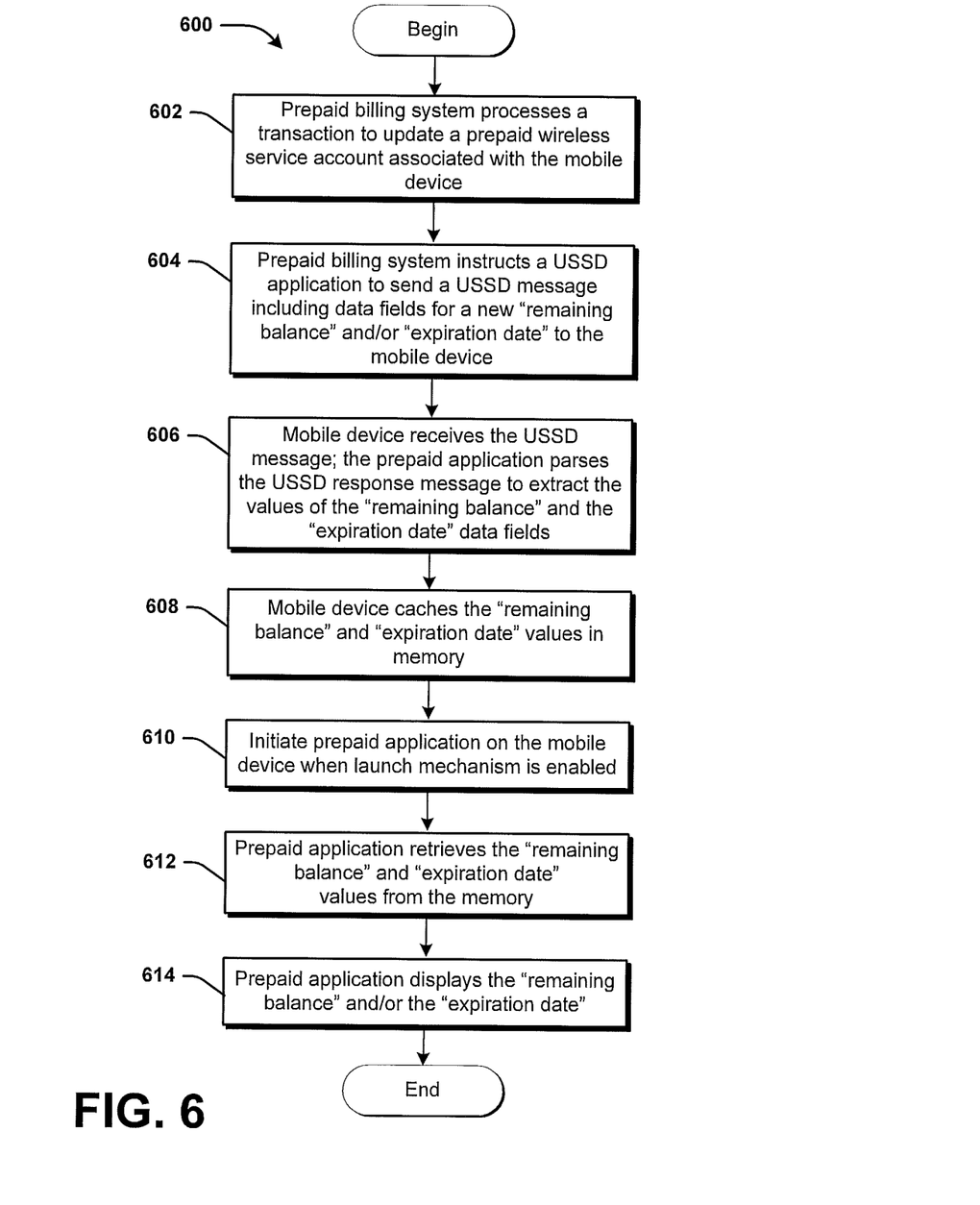
FIG. 6 illustrates an exemplary method, according to yet another embodiment of the present disclosure.

Turning now to FIG. 6, a method 600 is illustrated, according to another embodiment of the present disclosure.

It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed at least partially by execution of computer-readable instructions included on a computer-readable medium, such as the memory 204.

The method 600 begins and flow is to block 602, wherein the prepaid billing system 310 processes a transaction to update a prepaid wireless service account associated with the mobile device 100. The transaction may be conducted in a variety of ways, all of which result in a change being made to the balance, the number of minutes, and/or the expiration date for all or a portion of the number of minutes or balance on the prepaid account. For example, the transaction may be an Internet transaction, a retail transaction, a kiosk transaction, a telephone transaction, an SMS transaction, an MMS transaction, a USSD transaction, or another electronic transaction. At block 604, the prepaid billing system 310 instructs a USSD application 308 to send a USSD message including data fields for a new "remaining balance" and/or a new "expiration date" to the mobile device 100.

At block 606, the mobile device 100 receives the USSD message. At block 608, the mobile device 100 caches the values for the "remaining balance" and "expiration date" data fields in the memory 204. At block 610, the prepaid application 212 is initiated on the mobile device 100 in response to a launch mechanism being enabled. In the illustrated embodiment of FIG. 1, the launch mechanism is a swipe gesture received by the mobile device 100 through the capacitive touch sensor 104. Alternatively, another button, gesture, motion, or other input can be used as the launch mechanism for the prepaid application 212. At block 612, the prepaid application 212 retrieves the values from the memory 204.

At block 614, the prepaid application 212 displays the "remaining balance" and/or the "expiration date" according to the values received and/or how the prepaid application 212 is configured to display the received data. In one embodiment, the prepaid application 212 is configured to display the "remaining balance" and/or the "expiration date" in response to a first and a second swipe gesture, respectively, or vice versa. In another embodiment, both data types are displayed following a single swipe gesture. In any case, the displayed data may be removed following a subsequent swipe or other gesture. As described above, other gestures or inputs are contemplated. The method 600 can end.

Figure 7:
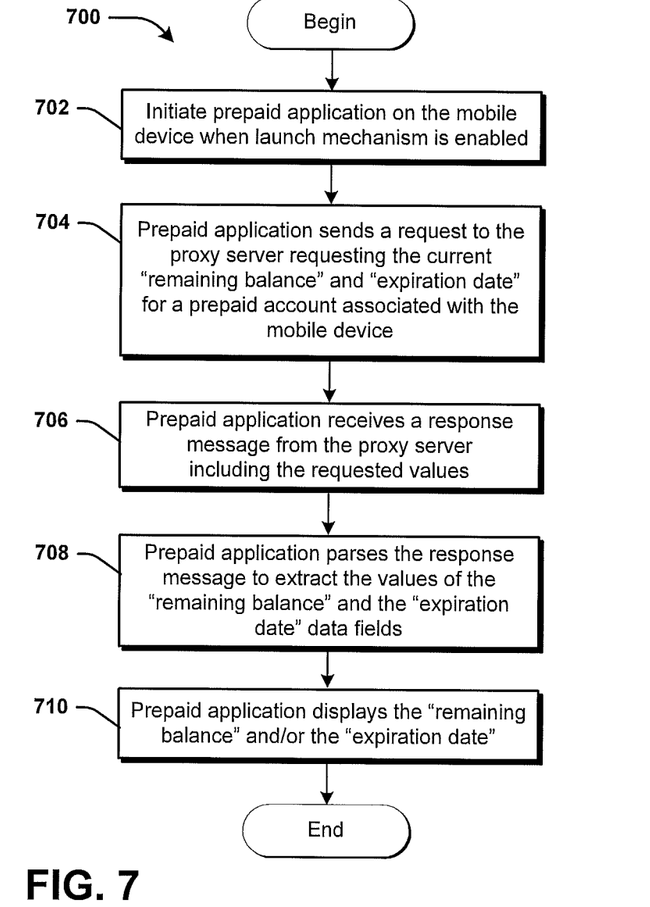
FIG. 7 illustrates an exemplary method, according to still another embodiment of the present disclosure.

Turning now to FIG. 7, a method 700 for operating the mobile device 100 is illustrated, according to another embodiment of the present disclosure. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed at least partially by execution of computer-readable instructions included on a computer-readable medium, such as the memory 204.

The method 700 begins and flow is to block 702, wherein the prepaid application 212 is initiated on the mobile device 100 in response to a launch mechanism being enabled. In the illustrated embodiment of FIG. 1, the launch mechanism is a swipe gesture received by the mobile device 100 through the capacitive touch sensor 104. Alternatively, another button, gesture, motion, or other input can be used as the launch mechanism for the prepaid application 212.

At block 704, the prepaid application 212 sends a request to the proxy server 314 requesting the current "remaining balance" and/or "expiration date" for a prepaid account associated with the mobile device 100. The proxy server 314 communicates with the prepaid billing system 310 to retrieve the requested information and reports back to the mobile device 100.

At block 706, the prepaid application 212 receives a response message from the proxy server 314 including the requested values. At block 708, the prepaid application 212 parses the response message to extract the values of the "remaining balance" and the "expiration date" data fields. At block 710, the prepaid application 212 displays the "remaining balance" and/or the "expiration date" according to the values extracted and/or how the prepaid application 212 is configured to display the received data. In one embodiment, the prepaid application 212 is configured to display the "remaining balance" and/or the "expiration date" on a first and a second swipe gesture, respectively, or vice versa. In another embodiment, both data types are displayed following a single swipe gesture. In any case, the displayed data may be removed following a subsequent swipe or other gesture. As described above, other gestures or inputs are contemplated. The method 700 can end.

While the present disclosure has been described with reference to prepaid wireless service accounts predominately, it is contemplated that systems, devices, and methods described herein can additionally or alternatively be applied to postpaid wireless service accounts. For postpaid accounts, an application stored on the mobile device 100 may use other USSD codes, such as *225# and *646# to retrieve an account bill balance and/or time (e.g., minutes) balance, respectively, for presentation on the display 102 of the mobile device 100 in response to receiving input from a launch mechanism, as described above.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   determining, by a processor of a mobile communication device, that a first swipe gesture was made, in a first direction, by way of a capacitive touch sensor of the mobile communication device, wherein the capacitive touch sensor is integrated into a portion of a display of the mobile communication device such that the portion of the display is provided a touchscreen interface;
   in response to determining that the first swipe gesture was made in the first direction,
      launching, by the processor, a prepaid application stored at the mobile communication device,
      retrieving, by the processor using the prepaid application, from a prepaid billing system, a balance associated with a prepaid wireless service account of the mobile communication device and an expiration time indicating a time remaining until the balance expires, and
      displaying, by the processor, on the display, the balance associated with the prepaid wireless service account of the mobile communication device;
   determining, by the processor, that a second swipe gesture was made, in the first direction, by way of the capacitive touch sensor;
   in response to determining that the second swipe gesture was made in the first direction, displaying, by the processor, on the display, the expiration time indicating the time remaining until the balance expires;
   determining, by the processor, that a third swipe gesture was made, in a second direction opposite the first direction, by way of the capacitive touch sensor; and
   in response to determining that the third swipe gesture was made in the second direction, removing, by the processor, the balance and the expiration time displayed on the display.

2. The method of claim 1, wherein the balance associated with the prepaid wireless service account comprises a currency amount in dollars.

3. The method of claim 1, wherein the balance associated with the prepaid wireless service account comprises a currency amount in a proprietary currency, the proprietary currency comprising one of a monetary currency or a number of minutes associated with the prepaid wireless service account.

4. The method of claim 1, further comprising determining whether the second swipe gesture is made by way of the capacitive touch sensor during a threshold time period, and wherein displaying, on the display, the expiration time indicating the time remaining until the balance expires comprises displaying, on the display, the expiration time indicating the time remaining until the balance expires if the second swipe gesture is made during the threshold time period.

5. The method of claim 4, further comprising receiving as input a custom time period, and wherein the threshold time period is set to the custom time period.

6. The method of claim 4, further comprising receiving, from a server, a custom time period, and wherein the threshold time period is set to the custom time period.

7. The method of claim 1, further comprising:
   in response to determining that the first swipe gesture was made in the first direction and prior to displaying the balance associated with the prepaid wireless service account, generating, using the prepaid application, a balance request to request, from the prepaid billing system, the balance and the expiration time;
   transmitting the balance request to the prepaid billing system; and
   receiving, from the prepaid billing system, a response to the balance request, the response comprising the balance and the expiration time.

8. The method of claim 7, wherein:
   generating the balance request comprises generating an unstructured supplementary service data code request to request the balance associated with the prepaid wireless service account;
   transmitting the balance request comprises transmitting the unstructured supplementary service data code request to the prepaid billing system by way of an unstructured supplementary service data gateway; and
   receiving the response comprises receiving an unstructured supplementary service data response.

9. A non-transitory computer-readable storage device comprising computer-executable instructions that, when executed by a processor of a mobile communication device, cause the processor to perform operations comprising:
   determining that a first swipe gesture was made, in a first direction, by way of a capacitive touch sensor of the mobile communication device, wherein the capacitive touch sensor is integrated into a portion of a display of the mobile communication device such that the portion of the display is provided a touchscreen interface;
   in response to determining that the first swipe gesture was made in the first direction,
      launching a prepaid application stored at the mobile communication device,
         retrieving, from a prepaid billing system, a balance associated with a prepaid wireless service account of the mobile communication device and an expiration time indicating a time remaining until the balance expires, and
         displaying, on the display, the balance associated with the prepaid wireless service account of the mobile communication device;
      determining that a second swipe gesture was made, in the first direction, by way of the capacitive touch sensor;
      in response to determining that the second swipe gesture was made in the first direction, displaying, on the display, the expiration time indicating the time remaining until the balance expires;
   determining that a third swipe gesture was made, in a second direction opposite the first direction, by way of the capacitive touch sensor; and
   in response to determining that the third swipe gesture was made in the second direction, removing the balance and the expiration time displayed on the display.

10. The non-transitory computer-readable storage device of claim 9, wherein the operations further comprise:
    in response to determining that the first swipe gesture was made in the first direction and prior to displaying the balance associated with the prepaid wireless service account, generating, using the prepaid application, a balance request to request, from the prepaid billing system, the balance and the expiration time;
    transmitting the balance request to the prepaid billing system; and
    receiving, from the prepaid billing system, a response to the balance request, the response comprising the balance and the expiration time.

11. The non-transitory computer-readable storage device of claim 10, wherein:
   generating the balance request comprises generating an unstructured supplementary service data code request to request the balance associated with the prepaid wireless service account;
   transmitting the balance request comprises transmitting the unstructured supplementary service data code request to the prepaid billing system by way of an unstructured supplementary service data gateway; and
   receiving the response comprises receiving an unstructured supplementary service data response.

12. The non-transitory computer-readable storage device of claim 9, wherein the operations further comprise determining whether the second swipe gesture is made by way of the capacitive touch sensor during a threshold time period, wherein displaying, on the display, the expiration time indicating the time remaining until the balance expires comprises displaying, on the display, the expiration time indicating the time remaining until the balance expires if the second swipe gesture is made during the threshold time period.

13. A mobile communication device comprising:
   a display;
   a capacitive touch sensor integrated into a portion of the display of the mobile communication device such that the portion of the display is provided a touchscreen interface;
   a processor; and
   a memory having stored thereon computer-executable instructions that, when executed by the processor, cause the processor to perform operations comprising
      determining that a first swipe gesture was made, in a first direction, via the capacitive touch sensor,
      in response to determining that the first swipe gesture was made in the first direction,
         launching a prepaid application stored at the mobile communication device,
         retrieving, using the prepaid application, from a prepaid billing system, a balance associated with a prepaid wireless service account of the mobile communication device and an expiration time indicating a time remaining until the balance expires, and
         displaying, on the display, the balance associated with the prepaid wireless service account of the mobile communication device,
      determining that a second swipe gesture was made, in the first direction, via the capacitive touch sensor,
      in response to determining that the second swipe gesture was made in the first direction, displaying, on the display, the expiration time indicating the time remaining until the balance expires;
      determining that a third swipe gesture was made, in a second direction opposite the first direction, via the capacitive touch sensor, and
      in response to determining that the third swipe gesture was made in the second direction, removing the balance and the expiration time displayed on the display.

14. The mobile communication device of claim 13, wherein the operations further comprise determining whether the second swipe gesture is made by way of the capacitive touch sensor during a threshold time period, wherein displaying, on the display, the expiration time indicating the time remaining until the balance expires comprises displaying, on the display, the expiration time indicating the time remaining until the balance expires if the second swipe gesture is made during the threshold time period.

15. The mobile communication device of claim 13, wherein the operations further comprise
   in response to determining that the first swipe gesture was made in the first direction and prior to displaying the balance associated with the prepaid wireless service account, generating, using the prepaid application, a balance request to request, from the prepaid billing system, the balance of the prepaid wireless service account;
   transmitting the balance request to the prepaid billing system; and
   receiving, from the prepaid billing system, a response to the balance request, the response comprising the balance and the expiration time.

* * * * *